UNITED STATES PATENT OFFICE.

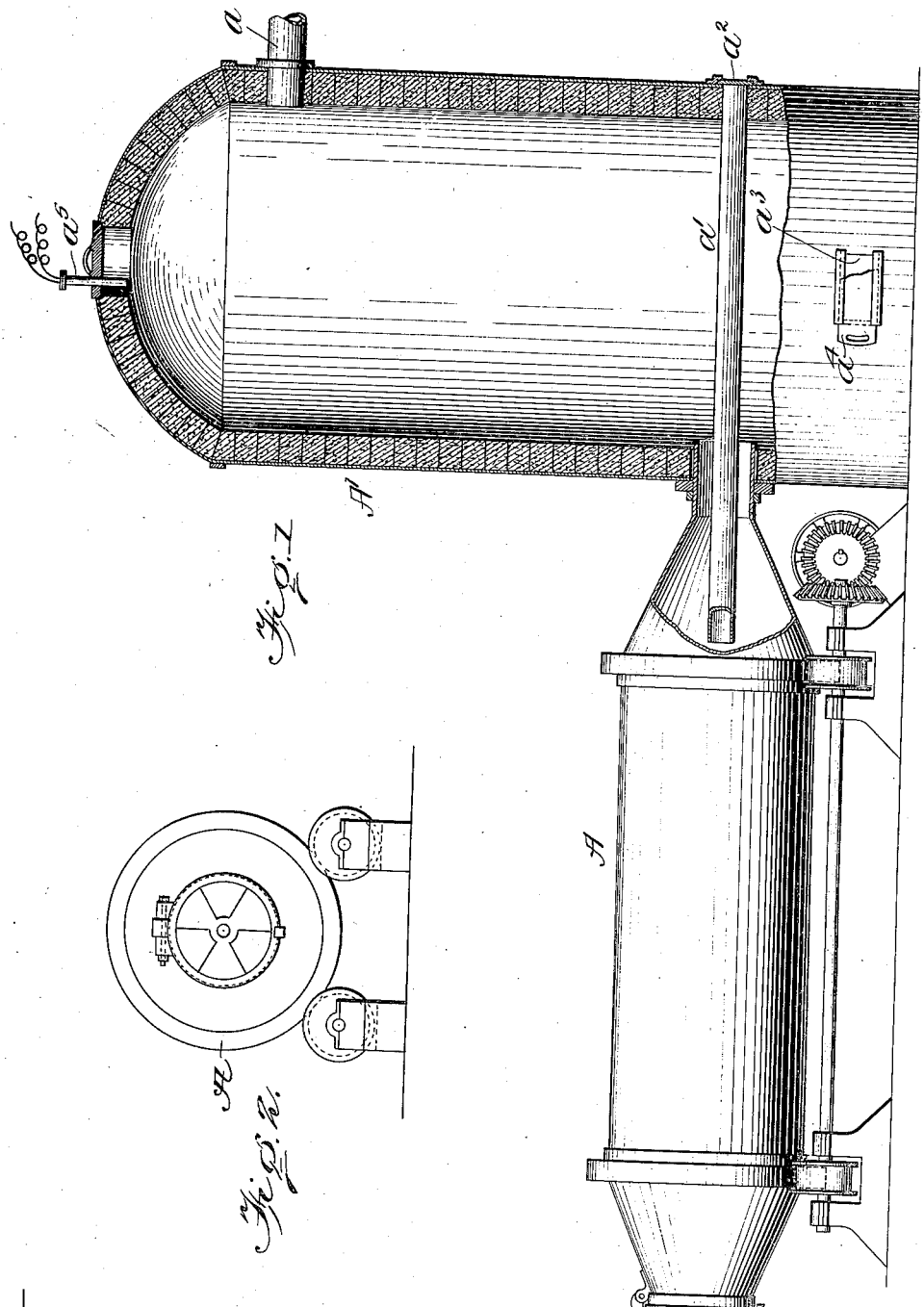

CHARLES B. CLARK, OF BANGOR, MAINE.

PROCESS OF OBTAINING SULFUR DIOXID.

952,098.

Specification of Letters Patent. Patented Mar. 15, 1910.

Application filed June 8, 1908. Serial No. 437,213.

*To all whom it may concern:*

Be it known that I, CHARLES B. CLARK, of Bangor, in the county of Penobscot and State of Maine, a citizen of the United States, have invented a new and useful Improvement in Processes of Obtaining Sulfur Dioxid, of which the following is a full, clear, and exact description, reference being had to the accompanying drawing, forming a part of this specification, in explaining its nature.

My invention relates to the making or producing of sulfur dioxid for use especially in connection with the sulfite process of manufacturing wood pulp.

As is well known to those skilled in the art, the methods ordinarily practiced by pulp makers for making sulfur dioxide are inefficient because sulfur trioxid together with vaporized sulfur or sulfur sublime is produced at the same time. The deleterious influences of these auxiliary substances are also well known. It may be said that the production of these substances causes a great loss in sulfur and lime, detracts from the efficiency of the sulfite process as a process for producing wood pulp, and injures the pulp. Moreover the pipes beyond the burner are liable to become corroded or become filled with a deposit from the vaporized sulfur which condenses in them. It can accordingly be seen that a proper production of sulfur dioxid vitally affects the sulfite process looked at economically or from the standpoint of efficiency. The reason why these auxiliary and deleterious substances are formed is that the sulfur is not burned in the presence of a proper amount of air and because also a proper temperature is not maintained. If too little air is admitted to the furnace for producing the gas the vaporized sulfur which may form will not be burned. On the other hand, if too much air is admitted, while the vaporized sulfur will be burned, either the sulfur dioxid will become much diluted and sulfur trioxid formed or the temperature will be so high as to form sulfur trioxid. It accordingly requires on the part of the operator a high degree of skill to properly operate a sulfur-burning furnace and the higher the degree of skill the less may be the production of the auxiliary deleterious substances before mentioned, but I know of no process and of no furnace used in connection with the sulfite process which tends to the formation of sulfur dioxid unaccompanied by the deleterious substances to which I have referred.

The object of my invention is to obtain practically a pure sulfur dioxid as an ultimate product and this by effecting such mode of regulation that sulfur trioxid or vaporized sulfur which may be formed, or be developed in the furnace, may be converted into sulfur dioxid and oxygen. I am enabled to do this by mixing with the gases or vapor coming from the burning sulfur such quantity of air as will furnish the oxygen necessary to burn the vaporized sulfur and by maintaining the gases at such temperature that any sulfur trioxid as may be formed will be converted or decomposed into sulfur dioxid and oxygen. Such regularity in temperature and admission of air I am enabled to obtain by the apparatus shown in the drawing in which—

Figure 1 shows the apparatus partly in side elevation and partly in vertical section. Fig. 2 is a front end view of the main body of the furnace or burner proper.

A represents a burner of a furnace in which the sulfur is primarily burned. The burner I have shown for purposes of illustration is one of a well known form. So far as my invention is concerned other forms of burners might be employed. The burner connects with a gas-receiving receptacle or combustion chamber $A^1$ which is preferably lined with brick or some material which renders it acid-proof and which will retain heat for assisting in maintaining a uniform temperature within it, as will hereinafter be explained. The receptacle or combustion chamber $A^1$ is preferably of such size as to form within it a gas-receiving chamber of relatively large capacity. The gases from the burner of the furnace enter this chamber and issue therefrom by the way of an outlet pipe $a$ from which the gas is directed through any system. In order to burn the vaporized sulfur which is formed in the burner A of the furnace there is employed a pipe $a^1$. This pipe is open to the atmosphere at one end and extends through the chamber of the receptacle $A^1$ into the back part of the furnace so as to conduct the air entering through this pipe to mingle intimately with the gases entering into the combustion chamber. There is thus supplied a sufficient amount of oxygen for burning the vaporized sulfur, the combustion thereof being completed within the combustion chamber. In this connection attention is directed to the gate or slide $a^2$ which controls the open end of the pipe $a^1$. By means of this gate just the proper amount of air may be admitted to burn the sulfur vapor. This air, also, is a heated air; air heated by the gases in the combustion chamber through which the pipe extends, on which account the combustion and decomposition of the gas and vapor are more readily brought about, doing away with the sudden expansion which would take place if cold air were admitted directly at this point. Moreover air may thus be supplied for burning the vaporized sulfur without materially affecting the temperature of the gases. I have found that if the temperature of the gases within the combustion chamber be maintained at or approximately at a temperature of 1100° C. the sulfur trioxid therein will be converted or decomposed into sulfur dioxid and oxygen. Accordingly it is my purpose to maintain the gases at or approximately at 1100° C. or such other degree of temperature as will decompose sulfur trioxid into sulfur dioxid and oxygen. In this connection I find that it is not advisable to maintain a temperature below 950° C. nor above 1200° C. though I have met with excellent results with a temperature maintained at about 1150° C. A proper temperature may easily be maintained in the combustion chamber by the air entering as aforesaid and if necessary by letting air into the combustion chamber by the way of an opening $a^3$ in the wall or shell thereof near the bottom, the amount of air let in through the opening $a^3$ being determined by the gate or slide $a^4$ controlling the opening. For observing the temperature a pyrometer $a^5$ may be used preferably located in the top of the combustion chamber.

If the opening in the bottom of the combustion chamber is relied upon to let in air for burning the vaporized sulfur, it is impossible to maintain such a temperature within the combustion chamber as will decompose the sulfur trioxid into sulfur dioxid and oxygen and there is danger also of converting much of the sulfur dioxid into sulfur trioxid by reason of developing too high a temperature. By means of the pipe $a^1$, however, air can be admitted for burning the vaporized sulfur without materially affecting the temperature of the gases within the combustion chamber for the air so admitted is heated before issuing from the pipe and by these very gases and accordingly in itself tends in part to keep the temperature of the gases in the combustion chamber at substantially the constant temperature desired to be obtained.

In operation the apparatus proves very effective, the sulfur vapor being entirely consumed and practically all the sulfur trioxid that forms being converted into sulfur dioxid and oxygen.

Having thus fully described my invention, I claim and desire to secure by Letters Patent of the United States:—

1. The process of obtaining sulfur dioxid consisting in burning the sulfur, admitting air to the gases and vapor of the burning sulfur for effecting the burning of the vaporized sulfur, and maintaining the gases and products of combustion at such temperature that sulfur trioxid therein may be converted or decomposed into sulfur dioxid and oxygen.

2. The process of obtaining sulfur dioxid consisting in burning the sulfur, admitting air to the vapors and gases from the burning sulfur for effecting the burning of the vaporized sulfur, and maintaining said gases and products of combustion at such a substantially even high temperature that sulfur trioxid therein may be converted or decomposed into sulfur dioxid and oxygen.

3. The process of obtaining sulfur dioxid consisting in burning sulfur, admitting heated air to the gases and vapor from the burning sulfur for effecting the burning of the vaporized sulfur, and regulating the temperature of said gases and products of combustion arrested and confined by a further admission of air whereby they may be maintained at such temperature that sulfur trioxid therein may be converted or decomposed into sulfur dioxid and oxygen.

4. The process of obtaining sulfur dioxid consisting in burning the sulfur, admitting heated air to the gases and vapor from the burning sulfur for effecting the consumption of the vaporized sulfur, and by a further admission of air maintaining said gases arrested and confined at approximately a temperature of 1100° C.

5. The process of obtaining sulfur dioxid consisting in burning the sulfur, admitting heated air to the gases and vapor from the burning sulfur for oxidizing the vaporized sulfur and for assisting in regulating the temperature of said gases and the products of combustion, and by a further admission of cooler air further regulating the temperature of said gases and products of combustion arrested and confined, whereby they may be maintained at such temperature that sulfur trioxid therein will be converted or decomposed into sulfur dioxid and oxygen.

6. The process of obtaining sulfur dioxid consisting in burning the sulfur, admitting heated air to the gases and products from the burning sulfur and maintaining said gases and products arrested and confined, at a temperature of approximately 1100° C.

CHARLES B. CLARK.

In the presence of—
CHARLES C. HOYT,
FRED C. DOLLIVER.